United States Patent
Ho et al.

(10) Patent No.: US 9,742,010 B2
(45) Date of Patent: Aug. 22, 2017

(54) CATALYST LAYER MATERIAL, METHOD FOR FABRICATING THE SAME, AND FUEL CELL

(75) Inventors: Van Thi Thanh Ho, Taipei (TW); Chun-Jern Pan, Pingtung County (TW); Wei-Nien Su, Taipei (TW); Bing-Joe Hwang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 52 days.

(21) Appl. No.: 13/533,976

(22) Filed: Jun. 27, 2012

(65) Prior Publication Data
US 2013/0065155 A1   Mar. 14, 2013

(30) Foreign Application Priority Data
Sep. 8, 2011 (TW) .............................. 100132440 A (51) Int. Cl.
*H01M 4/88* (2006.01)
*H01M 4/90* (2006.01)
*H01M 8/1011* (2016.01)

(52) U.S. Cl.
CPC ........... *H01M 4/88* (2013.01); *H01M 4/9075* (2013.01); *H01M 8/1011* (2013.01); *Y02E 60/523* (2013.01)

(58) Field of Classification Search
CPC .... H01M 8/1004; H01M 8/12; H01M 4/8605; H01M 4/925
USPC .... 429/480, 483–485, 487, 489, 231.5, 219, 429/220, 229, 222, 224, 221, 223, 231.6
See application file for complete search history.

(56) References Cited

U.S. PATENT DOCUMENTS 7,157,176 B2 * 1/2007 Tanuma ......................... 429/483

FOREIGN PATENT DOCUMENTS

| JP | 2007141626 | * | 6/2007 |
| JP | 2007227322 | * | 9/2007 |
| JP | 2008077999 | * | 4/2008 |
| WO | WO2010135576 | * | 11/2010 |

OTHER PUBLICATIONS

Wahi, Rajeev K., Liu, Yunping, Falkner, Joshua C., Colvin, Vicki L., Solvothermal synthesis and characterization of anatase TiO2 nanocrystals with untrahigh surface area, Journal of Colloidal and Interface Science 302 (2006) 530-536.*

(Continued)

*Primary Examiner* — Ula C Ruddock
*Assistant Examiner* — Thomas Parsons
(74) *Attorney, Agent, or Firm* — Jianq Chyun IP Office (57) ABSTRACT

A catalyst layer material, a method for fabricating the same, and a fuel cell are provided. The catalyst layer material utilized for the fuel cell includes a catalyst support and a catalyst distributed on the catalyst support. The catalyst support contains $Ti_xM_{1-x}O_2$, wherein M is selected from the group consisting of a Group IB metal, a Group IIA metal, a Group IIB metal, a Group IIIA, a Group VB metal, a Group VIB metal, a Group VIIB metal and a Group VIIIB metal, and $0<X\leq0.9$. By applying the non-carbonaceous catalyst support containing high conductivity metal elements to the fuel cell, stability and performance of the cell can be effectively enhanced.

4 Claims, 8 Drawing Sheets (56) References Cited

OTHER PUBLICATIONS

Sungju Yu, Hyeong Jin Yun, David Minzae Lee and Jongheop Yi, Preparation and characterization of Fe-doped TiO2 nanoparticles as a support for a high performance CO oxidation catalyst, Apr. 19, 2012, J. Mater. Chem., 2012, 22, 12629-12635.*

Ho et al., "Nanostructured Ti(0.7)Mo(0.3)O(2) Support Enhances Electron Transfer to Pt: High-Performance Catalyst for Oxygen Reduction Reaction," Journal of the American Chemical Society 133, Jun. 27, 2011, pp. 11716-11724.

Ho et al., "Robust non-carbon Ti(0.7)Ru(0.3)O(2) support with co-catalytic functionality for Pt: enhances catalytic activity and durability for fuel cells," Energy Environ. Sci. 4, Aug. 25, 2011, pp. 4194-4200.

Ho Thi Thanh Van, "Nanostructured Ti(0.7)M(0.3)O(2) (M: Mo, Ru) Supports with Novel Cocatalytic Functionality for Pt: Advanced Nanoelectrocatalysts for Fuel Cells," PhD Dissertation, Jul. 2011, National Taiwan University of Science and Technology, Department of Chemical Engineering.

Wang et al., "Highly stable and CO-tolerant Pt/Ti0.7W0.3O2 electrocatalyst for proton-exchange membrane fuel cells," Journal of American Chemical Society, Jul. 12, 2010, pp. 10218-10220.

"Office Action of Taiwan Counterpart Application", issued on Oct. 24, 2013, p. 1-p. 4, in which the listed reference was cited.

\* cited by examiner

CATALYST LAYER MATERIAL, METHOD FOR FABRICATING THE SAME, AND FUEL CELL

CROSS-REFERENCE TO RELATED APPLICATION

This application claims the priority benefit of Taiwan application serial no. 100132440, filed on Sep. 8, 2011. The entirety of the above-mentioned patent application is hereby incorporated by reference herein and made a part of this specification.

BACKGROUND OF THE INVENTION

1. Field of the Invention

The present invention relates to an electrochemical technique, and more particularly, to a catalyst layer material, a method for fabricating the same, and a fuel cell.

2. Description of Related Art

Exploitation and application of energy sources are always indispensable in our daily lives. The conventional techniques for exploiting and applying energy sources, however, lead to increasing environmental destruction. Fuel cell-based power generation characterized by high efficiency, low noise and non-pollution complies with the trend and therefore is very promising in the energy industry.

In brief, the fuel cell is substantially a power generator that converts chemical energy into electric energy by utilizing a reverse reaction of water electrolysis. The fuel cell can be categorized into many different types, wherein a proton exchange membrane fuel cell (PEMFC) and a direct methanol fuel cell (DMFC) are two commonly-used fuel cells. The fuel cell stack module mainly includes a membrane electrode assembly (MEA). The MEA is composed of a proton exchange membrane, an anode catalyst layer, a cathode catalyst layer, an anode gas diffusion layer (GDL), and a cathode GDL. The anode catalyst layer and the cathode catalyst layer are individually disposed at respective sides of the proton exchange membrane, and the anode GDL and the cathode GDL are respectively disposed at relative outsides of the anode catalyst layer and the cathode catalyst layer.

In the fuel cell, importance of a catalyst support in the anode catalyst layer or the cathode catalyst layer is often neglected. Generally speaking, carbon materials in various forms are commonly utilized as the catalyst (catalytic agent) support in the current techniques. In the actual application of the conventional fuel cell, the carbonaceous catalyst-support is, nevertheless, prone to corrosion in particular under repeated start-stop cycles or high-potential conditions, which may dramatically impact on performance and stability of the fuel cell.

SUMMARY OF THE INVENTION

Accordingly, the present invention is directed to a catalyst layer material and a method for fabricating the same, including a non-carbonaceous catalyst support.

The present invention is also directed to a fuel cell, which is provided with improved stability and performance.

A catalyst layer material for a fuel cell of the present invention is provided. The catalyst layer material includes a catalyst support and a catalyst distributed on the catalyst support. The catalyst support contains $Ti_xM_{1-x}O_2$, wherein M is selected from the group consisting of a Group IB metal, a Group IIA metal, a Group IIB metal, a Group IIIA metal, a Group VB metal, a Group VIB metal, a Group VIIB metal and a Group VIIIB metal, and $0<X\leq0.9$.

According to an embodiment of the present invention, in the catalyst layer material, X is defined by $0.5\leq X\leq0.9$.

According to an embodiment of the present invention, in the catalyst layer material, the Group IB metal is selected from the group consisting of Cu, Ag and Au.

According to an embodiment of the present invention, in the catalyst layer material, the Group IIA metal is Sr.

According to an embodiment of the present invention, in the catalyst layer material, the Group IIB metal is selected from the group consisting of Zn and Cd.

According to an embodiment of the present invention, in the catalyst layer material, the Group IIIA metal is selected from the group consisting of In and Ga.

According to an embodiment of the present invention, in the catalyst layer material, the Group VB metal is selected from the group consisting of V, Nb and Ta.

According to an embodiment of the present invention, in the catalyst layer material, the Group VIB metal is selected from the group consisting of Cr, Mo and W.

According to an embodiment of the present invention, in the catalyst layer material, the Group VIIB metal is selected from the group consisting of Mn, Tc and Re.

According to an embodiment of the present invention, in the catalyst layer material, the Group VIIIB metal is selected from the group consisting of Fe, Ru, Os, Co, Rh, Ir, Ni and Pd.

According to an embodiment of the present invention, in the catalyst layer material, the catalyst contains Pt or Pt alloys.

A fuel cell of the present invention is also provided, including a first gas diffusion layer, a second gas diffusion layer, a first catalyst layer, a second catalyst layer and a polymer film. The first catalyst layer and the second catalyst layer are both disposed between the first gas diffusion layer and the second gas diffusion layer, wherein at least one of the first catalyst layer and the second catalyst layer includes the catalyst layer material described in the foregoing embodiments. The polymer film is disposed between the first catalyst layer and the second catalyst layer.

A method for fabricating a catalyst layer material for a fuel cell of the present invention is provided, including following steps. A hydrothermal synthesis is performed so as to form a catalyst support from a first precursor and a second precursor. The catalyst support contains $Ti_xM_{1-x}O_2$, wherein M is selected from the group consisting of a Group IB metal, a Group IIA metal, a Group IIB metal, a Group IIIA metal, a Group VB metal, a Group VIB metal, a Group VIIB metal and a Group VIIIB metal, and $0<X\leq0.9$. The catalyst support is dispersed into a solvent, and a catalyst is added therein, so as to form a mixture. A microwave heating is performed to the mixture, so as to form a catalyst layer material.

According to an embodiment of the present invention, in the method for fabricating the catalyst layer material, the first precursor can be titanium halide, while the second precursor can be a metal halide selected from the group consisting of a Group IB metal, a Group IIA metal, a Group IIB metal, a Group IIIA metal, a Group VB metal, a Group VIB metal, a Group VIIB metal and a Group VIIIB metal, or the second precursor can be an oxoanion- or polyozometalate-containing salt.

According to an embodiment of the present invention, in the method for fabricating the catalyst layer material, the solvent is selected from the group consisting of water, ethylene glycol, dimethylformamide (DMF), acetonitrile (methyl cyanide) and butanol, for instance.

According to an embodiment of the present invention, in the method for fabricating the catalyst layer material, the hydrothermal synthesis is performed at a temperature ranging between 180° C. and 200° C.

According to an embodiment of the present invention, in the method for fabricating the catalyst layer material, the hydrothermal synthesis lasts for 90 minutes to 150 minutes.

According to an embodiment of the present invention, in the method for fabricating the catalyst layer material, a microwave frequency of the microwave heating is 2450 MHz.

According to an embodiment of the present invention, in the method for fabricating the catalyst layer material, a microwave power of the microwave heating ranges between 150 W and 300 W.

According to an embodiment of the present invention, in the method for fabricating the catalyst layer material, the microwave heating is performed at a temperature ranging between 140° C. and 180° C.

According to an embodiment of the present invention, in the method for fabricating the catalyst layer material, the microwave heating lasts for 60 minutes to 90 minutes.

According to an embodiment of the present invention, in the method for fabricating the catalyst layer material, the catalyst contains Pt or Pt alloys.

As mentioned above, in the present invention, the non-carbonaceous catalyst support is utilized in the catalyst layer material and the fabrication thereof that can be applied to the fuel cell, and thereby the problems regarding corrosion of the conventional carbonaceous catalyst support can be practically prevented. Accordingly, stability and active performance of the fuel cell can be outstandingly enhanced. Besides, metal elements contained in the catalyst support are properly chosen with high conductivity. Thus, the catalyst support can not only function as a material with high current conduction but as a co-catalyst in cooperative catalysis, and kinetic current of electrochemical reactions is also increased.

In order to make the aforementioned and other features and advantages of the present invention more comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In embodiments of the present invention, a catalyst support in a catalyst layer material contains $TiO_2$ with high stability in majority, and is doped with metal elements with high conductivity. Accordingly, an oxide carrier system is established having high surface area simultaneous with high electron conductivity, thereby solving the existing problems of corrosion in the carbonaceous support. In addition, the $TiO_2$-based catalyst support can improve stability that is insufficient in the carbonaceous support, and has a porous structure and an anti-poisoning effect. Moreover, the catalyst layer material in embodiments of the present invention can be applied to various fuel cells, such as a proton exchange membrane fuel cell (PEMFC) or a direct methanol fuel cell (DMFC).

Figure 1A:
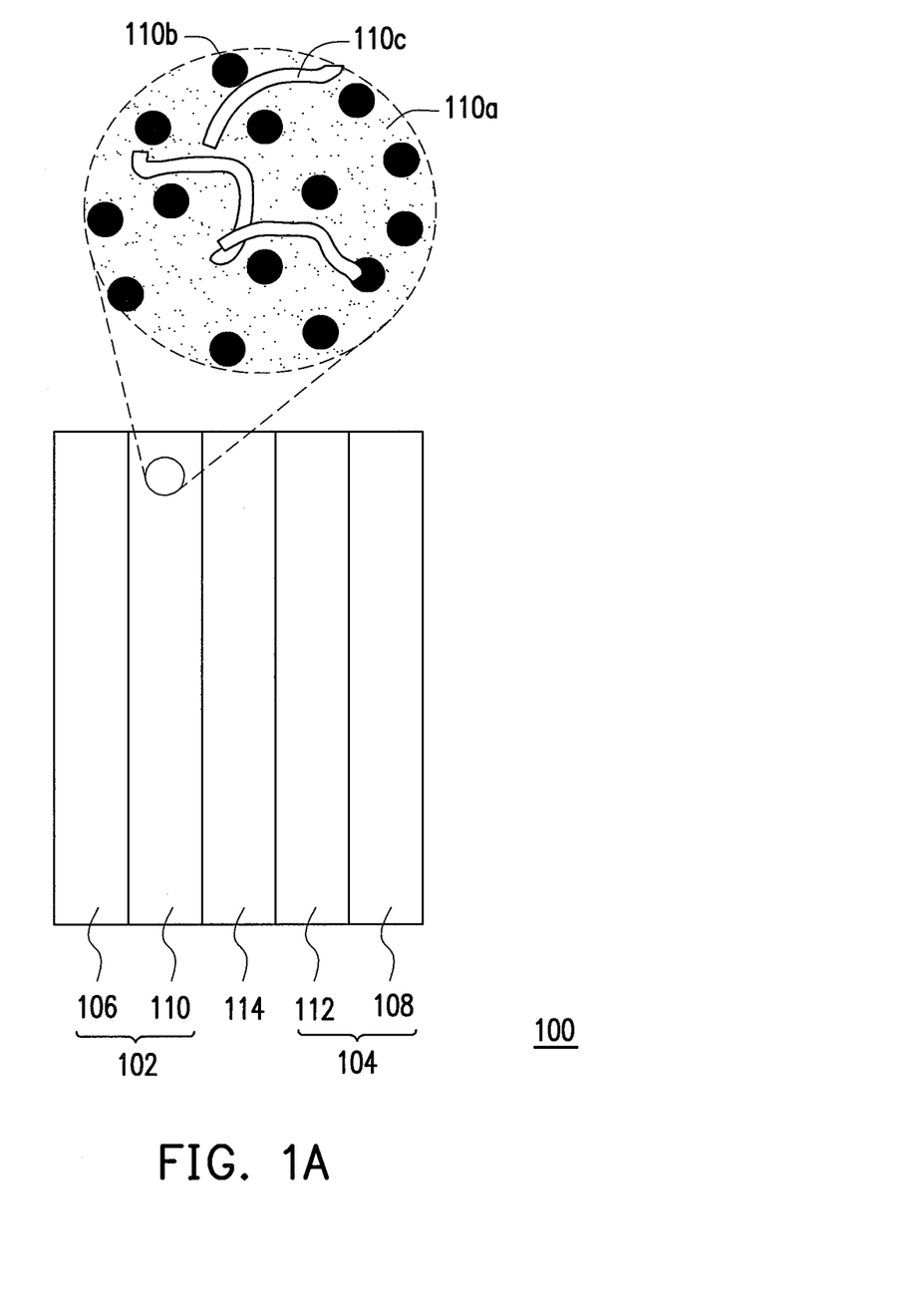
FIG. 1A depicts, in a schematic cross-sectional view, a fuel cell according to an embodiment of the present invention.

A catalyst layer material, a fabricating method thereof, and a fuel cell including the catalyst layer material according to the present invention are then illustrated in the following embodiments. Referring to FIG. 1A, a fuel cell 100 includes a first gas diffusion layer 106, a second gas diffusion layer 108, a first catalyst layer 110, a second catalyst layer 112 and a polymer film 114. The first catalyst layer 110 and the second catalyst layer 112 are disposed between the first gas diffusion layer 106 and the second gas diffusion layer 108, respectively. In an embodiment, the first gas diffusion layer 106 and the second gas diffusion layer 108 include porous conductor materials; therefore, the first gas diffusion layer 106 and the first catalyst layer 110 can jointly serve as a first electrode 102 (e.g. gas diffusion electrode) of the cell, while the second gas diffusion layer 108 and the second catalyst layer 112 can jointly serve as a second electrode 104 of the cell. The first electrode 102 may be an anode electrode, while the second electrode 104 may be a cathode electrode. The polymer film 114 is disposed between the first catalyst layer 110 and the second catalyst layer 112, wherein the polymer film 114 can be well chosen in accordance with types of the fuel cell 100.

The materials and formation of the first gas diffusion layer 106, the second gas diffusion layer 108 and the polymer film 114, or other components, are well appreciated by persons skilled in the art, and thus, the detailed descriptions thereof are not described herein.

Figure 1B:
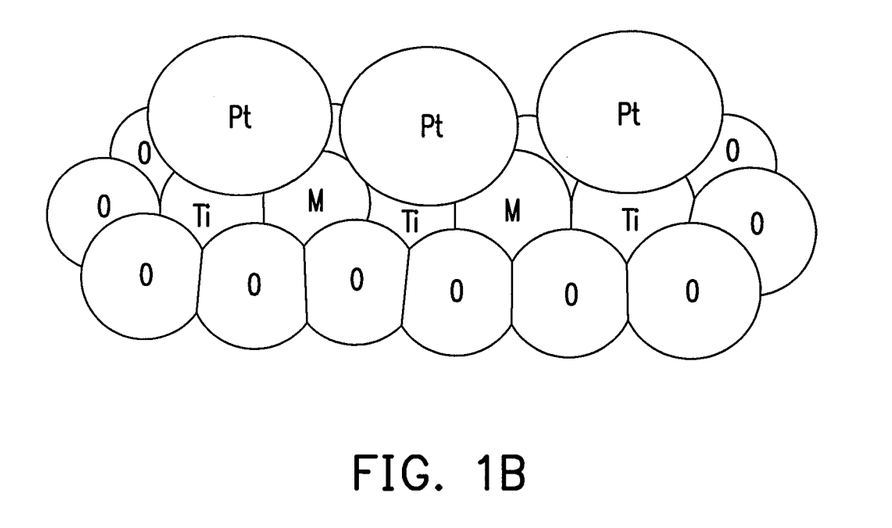
FIG. 1B schematically illustrates a molecular structure of a catalyst layer material according to an embodiment of the present invention.

As shown in a local enlargement of FIG. 1A and shown in FIG. 1B, at least one of the first catalyst layer 110 and the second catalyst layer 112 includes the catalyst layer material described in embodiments of the present invention, wherein the catalyst layer material includes a catalyst support 110a and catalysts 110b distributed on the catalyst support 110a. Specifically, the catalyst support 110a substantially includes $Ti_xM_{1-x}O_2$, wherein M can be metal elements with high conductivity, and the conductivity thereof is about $0.06\times10^6$ $ohm^{-1}$ $cm^{-1}$ to $0.65\times10^6$ $ohm^{-1}$ $cm^{-1}$. In more details, M is selected from the group consisting of a Group IB metal, a Group IIA metal, a Group IIB metal, a Group IIIA metal, a Group VB metal, a Group VIB metal, a Group VIIB metal and a Group VIIIB metal, and $0<X\leq0.9$. In an embodiment, X may be defined by $0.5\leq X\leq0.9$; in other words, the proportion of metal Ti contained in composition of the catalyst support 110a can be higher than or equal to that of metal M. In another embodiment, X may be defined by $0.6\leq X\leq0.8$. It should be noticed that if the proportion of metal M contained in the catalyst support 110a is too low (e.g. X approximating to or even greater than 0.9), the properties of the catalyst support 110a are more likely similar to those of titanium dioxide ($TiO_2$), thereby incapable of having high conductivity as required in the catalyst layer. On the other hand, if the proportion of metal M contained in the catalyst support 110a is too high (e.g. X less than 0.5), the properties of the catalyst support 110a are more likely similar to those of oxide of metal M (MO), thereby causing vanishment of high surface area or porous structures as required in the support and consequently turning into an oxide bulk. Furthermore, titanium dioxide ($TiO_2$) is relatively inexpensive. As the addition of metal M over rises, manufacturing costs are excessively increased, and therefore, the manufacture cannot be widely applied in mass production of the fuel cells. A BET surface area of the catalyst support 110a is, for example, about 200 $m^2$ $g^{-1}$ to 300 $m^2$ $g^{-1}$.

The Group IB metal may be selected from the group consisting of Cu, Ag and Au. The Group IIA metal may be Sr. The Group IIB metal may be selected from the group consisting of Zn and Cd. The Group IIIA metal may be selected from the group consisting of In and Ga. The Group VB metal may be selected from the group consisting of V, Nb, and Ta. The Group VIB metal may be selected from the group consisting of Cr, Mo and W. The Group VIIB metal may be selected from the group consisting of Mn, Tc and Re. The Group VIIIB metal may be selected from the group consisting of Fe, Ru, Os, Co, Rh, Ir, Ni and Pd.

The catalysts 110b in the catalyst layer material can contain Pt or Pt alloys, wherein the catalysts 110b is uniformly distributed on the catalyst support 110a, for example, in the form of nanoparticles, as shown in FIG. 1B. In an embodiment, the catalyst layer material may further include polymers 110c, distributed on the catalyst support 110a. For example, the polymers 110c contained in the catalyst layer material may be made of the same or like material of the polymer film 114, such that the first catalyst layer 110 or the second catalyst layer 112 can more easily bind with the neighboring polymer film 114. The polymers 110c can be formed of at least one of polymer monomers, high molecular polymers or polymer powders which have proton conduction properties, and are identical or similar to the composite material of the polymer film 114, such as commercial Nafion® 212 or Nafion® 117 manufactured by DuPont.

The catalyst layer material of the above-mentioned embodiments can be utilized for an anode catalyst layer or a cathode catalyst layer as demanded. Taking a direct methanol fuel cell (DMFC) as an example, when the catalyst layer material is utilized in the anode catalyst layer, a methanol oxidation reaction (MOR) may predominate in the catalyst layer material; when the catalyst layer material is utilized in cathode catalyst layer, an oxygen reduction reaction (ORR) may predominate in the catalyst layer material.

Since the catalyst layer material utilized for the fuel cell 100 contains $Ti_xM_{1-x}O_2$ with particle size about several nanometers and also with porosity as the catalyst support, the catalyst layer material can be provided with high surface area which enhances dispersibility and loading capacity of the catalysts. Moreover, thickness of the electrode can be thinned, and resistance of mass transfer can be lowered. Since the metal element M with high conductivity is doped into the $Ti_xM_{1-x}O_2$ catalyst support, electron conductivity of the catalyst layer is further enhanced. In addition, in the general methanol oxidation reaction, the catalysts are prone to be occupied by carbon oxide (CO) which reacts incompletely, and thus a so-called "poisoning" phenomenon occurs. That is to say, the catalysts may lose its desired activity due to the poisoning phenomenon. When metal M is appropriately chosen as the catalyst support $Ti_xM_{1-x}O_2$, CO adhered on the surface of the catalysts can react to form carbon dioxide ($CO_2$) from the surface of the catalysts. Therefore, the so-called CO poisoning phenomenon can be mitigated or suppressed. As such, when $Ti_xM_{1-x}O_2$ is utilized as the support material, metal M not only acts as an excellent conductor to conducting electrons, but also can significantly improve the catalyst activity or the effect upon anti-CO poisoning, thereby capable of satisfying the requirements of the support all-around.

Furthermore, although the embodiment illustrated in FIG. 1 depicts the first catalyst layer 110 including the catalyst layer material using $Ti_xM_{1-x}O_2$ as the catalyst support, the present invention is not limited thereto. In other words, at least one of the first catalyst layer 110 and the second catalyst layer 112 including $Pt/Ti_xM_{1-x}O_2$ or Pt alloy/$Ti_xM_{1-x}O_2$ is within the scope of the present invention, and other applications and modifications should be apparent to those of ordinary skill in the art in accordance with the said embodiments. Thus, detailed descriptions thereof are not specifically described herein.

Figure 2:
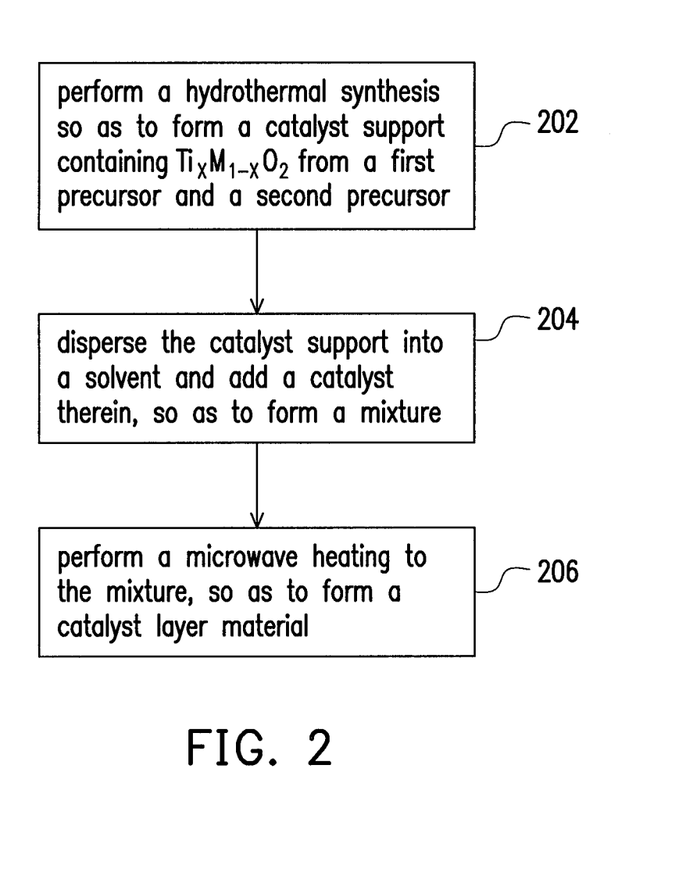
FIG. 2 is a flow chart illustrating a method for fabricating a catalyst layer material according to an embodiment of the present invention.

The method for fabricating the catalyst layer material is illustrated with a flowchart hereinafter. Referring to FIG. 2, in step 202, a hydrothermal synthesis is performed, so as to form the catalyst support of the embodiment, i.e. the catalyst support containing $Ti_xM_{1-x}O_2$, from the first precursor and a second precursor. In an embodiment, the first precursor may be titanium halide, and the second precursor may be a metal halide selected from the group consisting of a Group IB metal, a Group IIA metal, a Group IIB metal, a Group IIIA metal, a Group VB metal, a Group VIB metal, a Group VIIB metal and a Group VIIIB metal, or the second precursor may be an oxoanion- or polyozometalate-containing salt. For example, the second precursor can be a metal phosphate ($M-PO_4$), a metal sulfate ($M-SO_4$), a metal perchlorate ($M-ClO_4$), a metal molybdate ($M-MoO_4$), or a metal permanganate ($M-MnO_4$) containing the metal selected from the group consisting of a Group IB metal, a Group IIA metal, a Group IIB metal, a Group IIIA metal, a Group VB metal, a Group VIB metal, a Group VIIB metal and a Group VIIIB metal. Alternatively, the second precursor can be a polyozometalate prepared by co-synthesizing metal M and metallic anion formed of $Mo_6O_{19}^{2-}$ (Lindqvisthexamolybdate), $V_{10}O_{28}^{6-}$ (Decavanadate) or other transition metals. In an embodiment, the first precursor can be $TiCl_4$, while the second precursor can be $RuCl_3$ or $Na_2MoO_4$. The hydrothermal synthesis is performed at a temperature, for example, ranging between 180° C. and 200° C., and duration thereof may range between 90 minutes and 150 minutes. In an embodiment, the hydrothermal synthesis in step 202 can be performed in the presence of oxidant, such that purity of the product can be enhanced. The oxidant is, for example, $H_2O_2$.

Afterwards, in step 204, the synthesized catalyst support is dispersed into a solvent, and catalysts are added therein, so as to form a mixture. In an embodiment, the catalysts may contain Pt or Pt alloys, possibly in the form of $H_2PtCl_6 \cdot N 6H_2O$. The catalysts may exist in the form of nanoparticles. The solvent is, for example, water, ethylene glycol, dimethylformamide (DMF), acetonitrile (methyl cyanide) or butanol.

In step 206, a microwave heating synthesis is then performed to the mixture, so as to form a catalyst layer material. By means of the microwave heating, the Pt-containing catalysts (e.g. $H_2PtCl_6 \cdot 6H_2O$) can be reduced into Pt, which is capable of catalysis. A microwave frequency of the microwave heating can be 2450 MHz, and a microwave power of the microwave heating can range between 150 W and 300 W. Besides, the solvent-thermal synthesis is carried out at a temperature within a range of 140° C. to 180° C., and duration thereof can range between 60 minutes and 90 minutes. It should be mentioned that the constant microwave frequency utilized in the microwave heating is chosen to prevent disturbance in communication of cell phones and telephones, and should not be limited. Moreover, the duration and effects of the microwave heating synthesis may vary in accordance with the type of the chosen solvent, and thus, other applications and modifications should be apparent to those of ordinary skill in the art.

Afterwards, the resultant catalyst layer material can be applied to the membrane electrode assembly (MEA) of the fuel cell, such as fabrication of a 3-layered or 5-layered membrane electrode assembly. In the fabrication of the 3-layered membrane electrode assembly, the catalyst layer is directly supported by the polymer film; in the fabrication of the 5-layered membrane electrode assembly, the catalyst layer is supported by the gas diffusion layer, as respectively illustrated with the structure shown in FIG. 1A hereafter.

In an embodiment, the fabrication of the 3-layered membrane electrode assembly can be implemented by following steps: uniformly coating the catalyst layer material including the catalyst support 110a and the catalysts 110b onto respective sides of the polymer film 114; conducting a hot pressing treatment so as to transfer the first catalyst layer 110 and the second catalyst layer 112 onto the polymer film 114; as finishing the membrane electrode, conducting another hot pressing treatment to compress the first gas diffusion layer 106 and the second gas diffusion layer 108 therewith. In another embodiment, the fabrication of the 5-layered membrane electrode assembly can be implemented by following steps: uniformly coating the catalyst layer material including the catalyst support 110a and the catalysts 110b onto the first gas diffusion layer 106 and the second gas diffusion layer 108; after drying, forming the first catalyst layer 110 and the second catalyst layer 112 on the first gas diffusion layer 106 and the second gas diffusion layer 108; then compressing the first gas diffusion layer 106, the second gas diffusion layer 108 and the polymer film 114 by hot pressing. The catalysts 110b are necessary to be supported by the catalyst support 110a in the catalyst layer material, no matter what method is adopted to fabricating the membrane electrode assembly, such that the catalyst layer material can be easily coated onto the polymer film 114, the first gas diffusion layer 106, or the second gas diffusion layer 108.

As compared with the conventional oxide synthesized by the ordinary solid phase method having larger particle size and incapable of providing sufficient surface area, the fabrication method in embodiments of the present invention utilizes the hydrothermal method to synthesize oxide carriers with particle size about several nanometers as the non-carbonaceous support, which may significantly enhance the surface area of the catalyst support thereby ameliorating the dispersibility and the loading capacity of the supported catalysts. In addition, the porous material can be formed by merely the hydrothermal method in the fabrication of the catalyst layer material according to an embodiment of the present invention, without using pore-forming particles, surfactant or silica template. Accordingly, procedure of the process can be simplified, and manufacturing costs can be lowered.

The following experimental data are provided merely to illustrate the catalyst layer material fabricated according to embodiments of the present invention and comparison of properties and performance as applied to the fuel cell, but are not intended to limit the scope of the present invention.

EXAMPLE 1

Preparation of $Pt/Ti_{0.7}Ru_{0.3}O_2$ $Ti_{0.7}Ru_{0.3}O_2$ nanoparticles were prepared as following: an aqueous solution containing 12 mM $RuCl_3$ and 28 mM $TiCl_4$ precursors solution (with molar ratio of Ru:Ti=3:7) was prepared. Then, 1 mL $H_2O_2$ 30 wt % in water was added into the $RuCl_3$ solution to oxidize $Ru^{+3}$ to $Ru^{+4}$ before mixing with $TiCl_4$ solution. The uniformity of the mixing constituents of the dispersion may be enhanced by stirring for 15 minutes. The precursor solution was transferred to a Teflon-lined autoclave with a stainless steel shell and heated to 200° C. at 10° C./min. The reaction was kept at 200° C. for 2 hours in the oven and then cooled to room temperature. After finishing the reaction, the suspension was washed with water and collected by centrifugation several times until the washings showed pH 7. The precipitates were dried in a vacuum oven overnight (>8 hours) at 80° C. for the electrochemical and textural analyses.

The synthesis was carried out with the aid of a domestic microwave oven (LG MG-5021MW1, 300 W, 2450 MHz). Platinum catalyst was deposited as follows: 2.56 mL of 50 mM $H_2PtCl_6$ was added to 20 mL of ethylene glycol to produce a yellowish solution. Then, 0.100 g of $Ti_{0.7}Ru_{0.3}O_2$ nanoparticles were mixed with the solution containing hexachloroplatinic acid and ultrasonicated for 30 min, followed by the addition of 0.8 M sodium hydroxide to adjust pH to 11.0. The suspension was exposed in the middle of the microwave oven at 150 W and 165° C. for 1 hour. When the reaction was complete, the sample was cooled in air, and the black precipitate was collected by repeated centrifugation and then washed with acetone and deionized water. The resulting $Pt/Ti_{0.7}Ru_{0.3}O_2$ was dried at 80° C. in a vacuum oven overnight for further use.

Figure 3A:
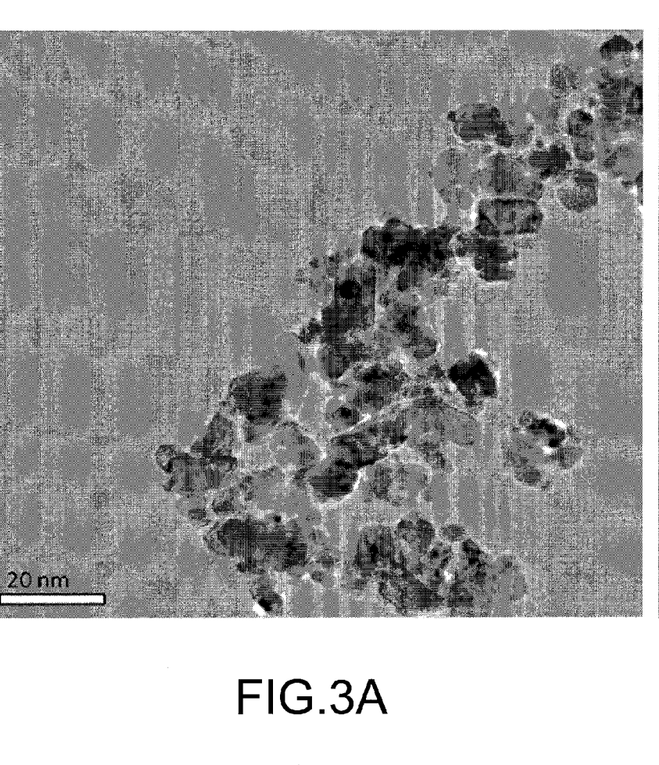
FIGS. 3A and 3B are transmission electron microscopy (TEM) images of $Ti_{0.7}Ru_{0.3}O_2$ and $Pt/Ti_{0.7}Ru_{0.3}O_2$ fabricated from examples of the present invention, respectively.
Figure 3B:
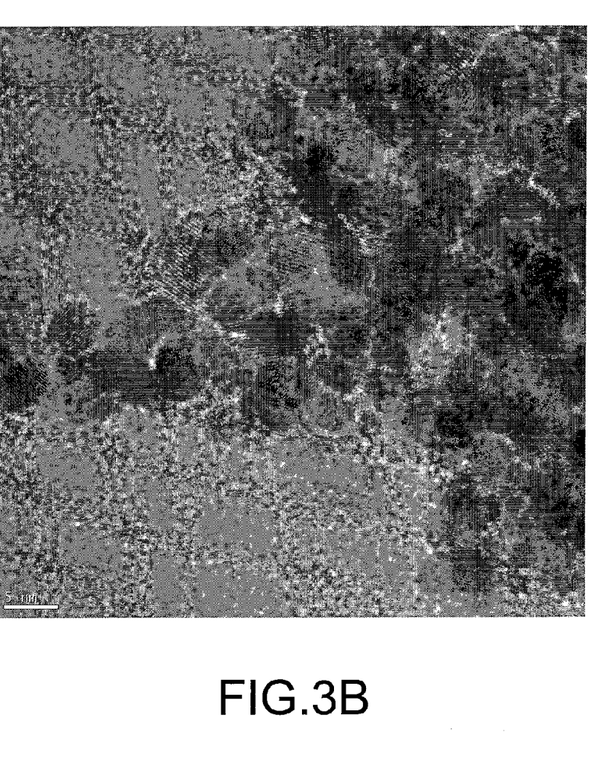

As shown in FIG. 3A, since the prepared $Ti_{0.7}Ru_{0.3}O_2$ had small particle size (about 8 nm to 10 nm) and was uniformly distributed, the $Ti_{0.7}Ru_{0.3}O_2$ possessed a BET surface area of 275.59 $m^2 g^{-1}$, which was higher than that of the well known carbon black catalyst support, e.g. Vulcan XC-72 (254 $m^2$ $g^{-1}$), or that of other non-carbonaceous materials. The spherical platinum particles with an average particle size of 3.5 nm and well dispersed were anchored on the surface of the $Ti_{0.7}Ru_{0.3}O_2$ support. As shown in FIG. 3B, these Pt nanoparticles had good crystallinity and well-defined lattice fringes. The actually loading of Pt particles on the $Ti_{0.7}Ru_{0.3}O_2$ support was about 18.54 wt %, which was very close to the nominal loading of $Pt/Ti_{0.7}Ru_{0.3}O_2$, i.e. 20 wt %.

EXAMPLE 2

Application of $Pt/Ti_{0.7}Ru_{0.3}O_2$ and Pt or PtRu alloy catalysts on commercial carbonaceous support in direct methanol fuel cell (DMFC) anode and comparison of properties and performance.

Figure 4:
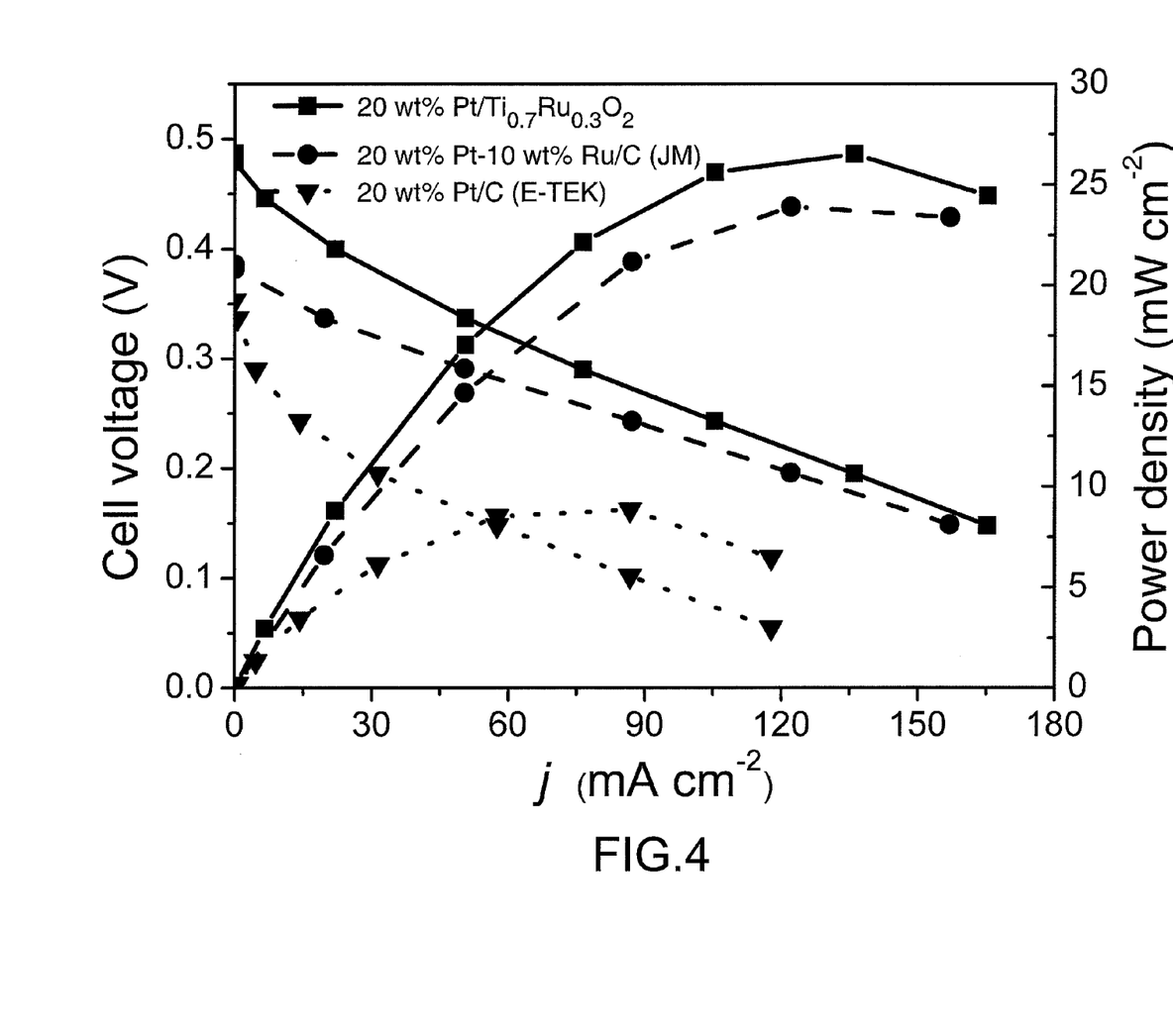
FIG. 4 is a curve chart illustrating performance comparison of 20 wt % Pt/C (E-TEK), 30 wt % PtRu(2:1)/C (JM) and 20 wt % $Pt/Ti_{0.7}Ru_{0.3}O_2$ nano-catalysts which are respectively applied as anode catalysts of direct methanol fuel cell (DMFC) according to examples of the present invention.

In this example, the catalytic performance of the prepared $Pt/Ti_{0.7}Ru_{0.3}O_2$ and the commercial Pt/C (E-TEK) and PtRu/C (JM) catalysts was compared in a practical DMFC system. FIG. 4 is a curve chart illustrating performance comparison of 20 wt % Pt/C (E-TEK), 30 wt % PtRu(2:1)/C (JM) and 20 wt % $Pt/Ti_{0.7}Ru_{0.3}O_2$ nano-catalysts which are respectively applied as anode catalysts of DMFC according to examples of the present invention. These DMFC systems shown in FIG. 4 were operated with 2M methanol at 60° C. under the same testing conditions (with commercial Pt/C (E-TEK) as cathode and respective nanocatalysts as anode). The Pt loading of the catalyst support was controlled at 0.5 $mg/cm^2$ at anodic side and 0.5 $mg/cm^2$ at the cathode side for all catalysts.

As the results demonstrated in FIG. 4, it can be indicated that the performance of DMFC with 20 wt % $Pt/Ti_{0.7}Ru_{0.3}O_2$ as anode catalyst is much better with higher open circuit voltage (OCV) and current density than those of the commercial catalysts, i.e. Pt/C (E-TEK) and PtRu/C (JM). Moreover, the DMFC with $Pt/Ti_{0.7}Ru_{0.3}O_2$ anode produced a maximum power density about 26.2 $mW/cm^2$, which was higher than that of Pt/C (E-TEK) (8.0 $mW/cm^2$) and PtRu/C (JM) (24.0 $mW/cm^2$) respectively.

Based on the above results, $RuO_2$ in the $Ti_{0.7}Ru_{0.3}O_2$ catalyst support is not only a good conductive catalyst support for Pt, but also performs as excellent co-catalyst in Pt electro-catalysis in the methanol oxidation reaction. Because hydrous ruthenium oxide is a mixed proton-and-electron conductor that can supply —OH group to oxidize neighboring Pt—CO, and thereby intensifying the catalytic capability and mitigating the CO poisoning phenomenon of Pt catalysts by the well-known bi-functional effect.

Additionally, there was a significant difference in the mass transfer kinetics between $Pt/Ti_{0.7}Ru_{0.3}O_2$ and Pt/C (E-TEK) or PtRu/C (JM). In the case of Pt/C (E-TEK) and PtRu/C (JM), the required thickness of the catalyst layer was about 14 μm at a desired Pt loading of 0.5 $mg/cm^2$. In contrast to Pt and PtRu loaded on the carbonaceous support, an ultra thin catalyst layer (about 3.5 μm) could be obtained for the $Pt/Ti_{0.7}Ru_{0.3}O_2$ catalyst at the same Pt loading, owing to 3-fold higher density of $Ti_{0.7}Ru_{0.3}O_2$ as compared with carbon. This difference is directly reflected in an increase in the current density due to the improved mass transfer kinetics. Therefore, the high fuel cell performance of $Pt/Ti_{0.7}Ru_{0.3}O_2$ can be attributed to the low mass transport limitation. The high performance of $Pt/Ti_{0.7}Ru_{0.3}O_2$ catalysts is also obtained by the highly stable and highly CO-tolerant of $Pt/Ti_{0.7}Ru_{0.3}O_2$ in a fuel cell environment. The high stability of $Pt/Ti_{0.7}Ru_{0.3}O_2$ catalysts can be attributed to a strong metal support interaction (SMSI) between the Pt particles and the $Ti_{0.7}Ru_{0.3}O_2$ support, wherein $Ti_{0.7}Ru_{0.3}O_2$ can anchor the Pt particles by interacting with Pt and thereby inhibit Pt migration and agglomeration. Further, the SMSI is advantageous to oxidative activity of the Pt catalysts through donation of electron groups, and the catalyst material, thus, possesses superior stability even in an acidic or oxidizing reactive environment.

EXAMPLE 3

Preparation of $Pt/Ti_{0.7}Mo_{0.3}O_2$

Similar to Example 1, $Ti_{0.7}Mo_{0.3}O_2$ was synthesized by the hydrothermal method as follows. First, 0.155 mL of pure $TiCl_4$ was dissolved in 30 mL of 1 M HCl, and 0.146 g of $Na_2MoO_4.2H_2O$ was dissolved in 20 mL of distilled water. Then, $TiCl_4$ solution was mixed with $Na_2MoO_4$ solution, followed by stirring 30 minutes at room temperature. After that, the mixed solution was transferred to a Teflon-lined autoclave with a stainless steel shell and heated to 200° C. at 10° C./min. The reaction time was kept at 2 hours. After finishing the reaction, the system was cooled naturally to room temperature. The as-synthesized sample of $Ti_{0.7}Mo_{0.3}O_2$ was obtained after washing, centrifuge many times and drying in the oven at 80° C. overnight. So the as-synthesized $Ti_{0.7}Mo_{0.3}O_2$ support can be obtained with high purity, good crystallize and fine powder under using the hydrothermal process.

The 20 wt % Pt loading was deposited on the $Ti_{0.7}Mo_{0.3}O_2$ in following steps. Platinum (intake 20 wt %) was deposited as follows: 2.0 mL of 50 mM hexachloroplatinic acid in ethylene glycol was added to 30 mL of ethylene glycol to produce a yellowish solution. $Ti_{0.7}Mo_{0.3}O_2$ (80 mg) was mixed with the solution containing hexachloroplatinic acid, ultrasonicated for 30 minutes, followed by the addition of sodium hydroxide (0.8 M) to adjust the pH to 11.0. The suspension was exposed in a microwave oven with 150 W at 160° C. for 1 hour. When the reaction was complete, the sample was cooled in air. The black precipitate was collected by repeated centrifugation and washed with acetone and deionized water. The resulting $Pt/Ti_{0.7}Mo_{0.3}O_2$ was dried at 80° C. in a vacuum oven overnight. The as-synthesized sample of 20 wt % $Pt/Ti_{0.7}Mo_{0.3}O_2$ was tested for property identification and performance test as applied to the fuel cell.

EXAMPLE 4

Application of $Pt/Ti_{0.7}Mo_{0.3}O_2$ and Pt or PtCo alloy catalysts on commercial carbonaceous support in oxygen reduction reaction (ORR) at fuel cell cathode and comparison of properties and performance.

For comparing activity of oxygen reduction reaction, onset potential and kinetic current of $Pt/Ti_{0.7}Mo_{0.3}O_2$ were measured and compared with the commercial catalysts, such as Pt/C (E-TEK) and PtCo/C (E-TEK). For the catalyst to exhibit excellent performance, the catalyst must meet requirements of having a high onset potential and maintaining a constant normalized current density from the viewpoints of activity and stability.

Figure 5:
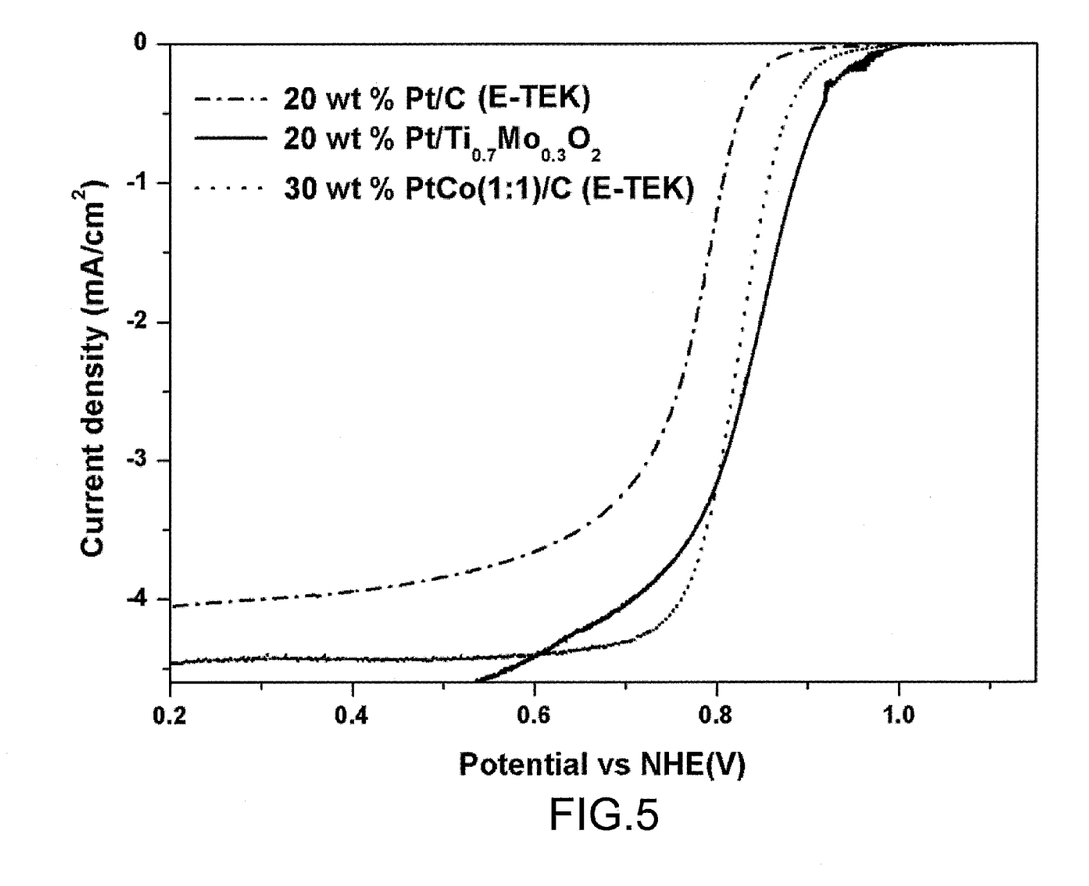
FIG. 5 is a chart illustrating current density and onset potential compared with a normal hydrogen electrode (NHE) of $Pt/Ti_{0.7}Mo_{0.3}O_2$, Pt/C (E-TEK) and PtCo(1:1)/C (E-TEK) both using commercial carbonaceous supports respectively as fuel cell cathodes in three proton exchange membrane fuel cell (PEMFC) systems according to examples of the present invention.

FIG. 5 is a chart illustrating current density and onset potential compared with a normal hydrogen electrode (NHE) of $Pt/Ti_{0.7}Mo_{0.3}O_2$, Pt/C (E-TEK) and PtCo(1:1)/C (E-TEK) both using commercial carbonaceous supports respectively as fuel cell cathodes in three PEMFC systems according to examples of the present invention. As illustrate in FIG. 5, the ORR onset potential of the novel $Pt/Ti_{0.7}Mo_{0.3}O_2$ catalyst shifted toward higher potential, which was higher than commercial 20 wt % Pt/C (E-TEK)

and 30 wt % PtCo(1:1)/C (E-TEK). In comparison of kinetic current at 0.9 V, the kinetic current of the Pt/Ti$_{0.7}$Mo$_{0.3}$O$_2$ catalyst also much increased over 12 times of that of commercial 20 wt % Pt/C (E-TEK) and over 3 times of that of commercial 30 wt % PtCo(1:1)/C (E-TEK), as listed in Table 1.

TABLE 1

| Catalyst | Onset potential vs NHE (mV) | Kinetic current at 0.9 V (mA) |
|---|---|---|
| 20 wt % Pt/C (E-TEK) | 954 | 0.056 |
| 30 wt % PtCo(1:1)/C (E-TEK) | 977 | 0.218 |
| 20 wt % Pt/Ti$_{0.7}$Mo$_{0.3}$O$_2$ | 995 | 0.667 |

As verified by x-ray absorption spectroscopy (XAS) measurements, intensity of Pt/Ti$_{0.7}$Mo$_{0.3}$O$_2$ was higher than those of Ti$_{0.7}$Mo$_{0.3}$O$_2$ and TiO$_2$ in the spectrum, indicating the electron donation from stable Ti$_{0.7}$Mo$_{0.3}$O$_2$ to Pt. Therefore, the said the electron donation not only facilitates substantial increase in activity of Pt catalyst to the reduction reaction but also provision of the strong metal support interaction (SMSI) between the Ti$_{0.7}$Mo$_{0.3}$O$_2$ support and Pt. Ti$_{0.7}$Mo$_{0.3}$O$_2$ as the Pt support material has excellent activity for the ORR and high stability in a cathode environment. Specially, the novel Pt/Ti$_{0.7}$Mo$_{0.3}$O$_2$ catalyst can address to solve the problem of Pt instability at the cathode side which represents one of the major limitations for commercialization of the ordinary fuel cells.

EXAMPLE 5

Preparation of Ti$_{0.9}$Mo$_{0.1}$O$_2$

Ti$_{0.9}$Mn$_{0.1}$O$_2$ was synthesized using tetrabutyl titanate and manganese chloride tetrahydrate as precursors in an n-propanol solution. Then, 1.84 mL of Ti(OCH$_2$CH$_2$CH$_2$CH$_3$)$_4$ was added to 60 mL of n-propanol, followed by dropwise addition of 2.352 mL 0.251 M MnCl$_2$.4H$_2$O in n-propanol. After 20 minutes stirring, 1.176 mL DI water was slowly added with gentle stirring. The hydrothermal reaction was carried out in an autoclave for 8 hours at 200° C. After gradually cooling to room temperature, the precipitate was separated with centrifugation at 8000 rpm, dried at 80° C. for overnight. The dried sample was calcined with the temperature of the furnace raised to 450° C. at a rate of 5° C. min$^{-1}$ and maintained for 2 hours.

Figure 6:
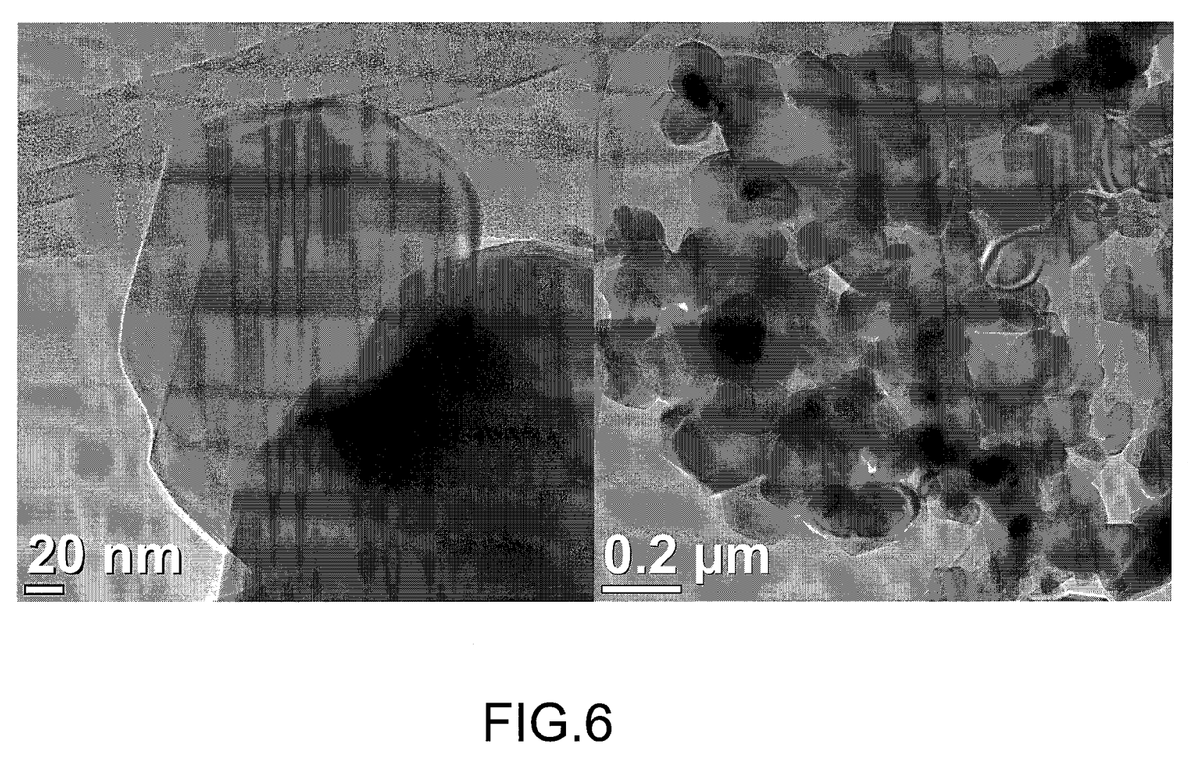
FIG. 6 is a transmission electron microscopy (TEM) image of $Ti_{0.9}Mn_{0.1}O_2$ fabricated from an example of the present invention.

The TEM image of Ti$_{0.9}$Mn$_{0.1}$O$_2$ prepared in Example 5 is shown in FIG. 6. Besides, catalyst (e.g. Pt) can be loaded on Ti$_{0.9}$Mn$_{0.1}$O$_2$ with one of the above-mentioned methods, and the details are not iterated herein.

Figure 7:
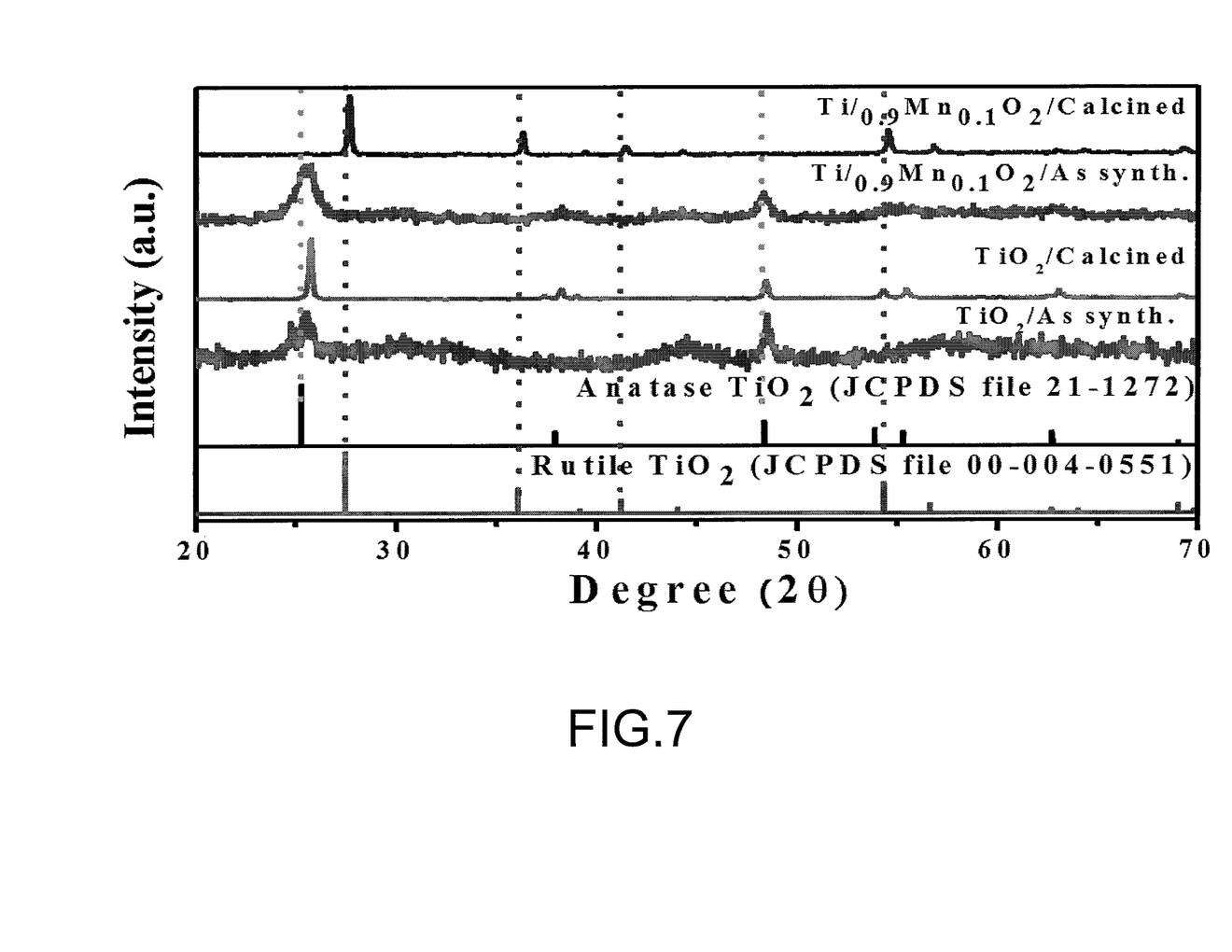
FIG. 7 is a chart illustrating X-ray diffraction (XRD) spectra of as-synthesized $Ti_{0.9}Mn_{0.1}O_2$, calcined $Ti_{0.9}Mn_{0.1}O_2$, as-synthesized $TiO_2$, calcined $TiO_2$, anatase $TiO_2$ and rutile $TiO_2$.

FIG. 7 is a chart illustrating X-ray diffraction (XRD) spectra of as-synthesized Ti$_{0.9}$Mn$_{0.1}$O$_2$, calcined Ti$_{0.9}$Mn$_{0.1}$O$_2$, as-synthesized TiO$_2$, calcined TiO$_2$, anatase TiO$_2$ and rutile TiO$_2$. It is noted that TiO$_2$ doped with Mn might promote the phase transition from the anatase to rutile after calcination treatment at 450° C. (thermal annealing in ambient or oxygen-rich environment).

Figure 8:
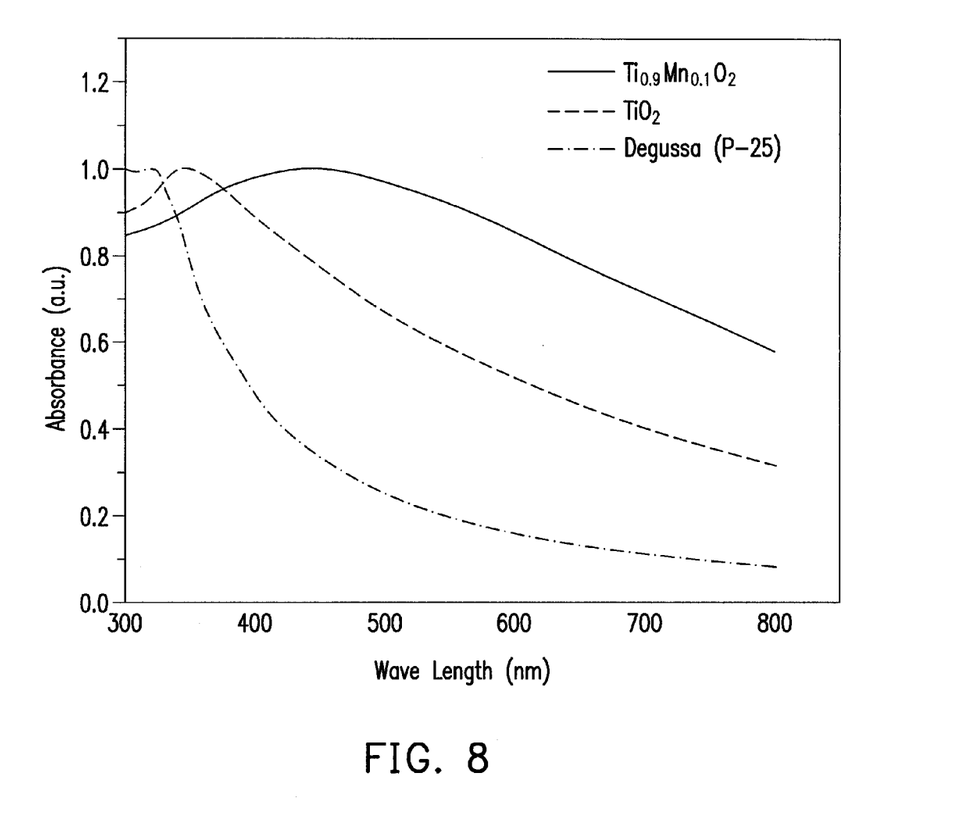
FIG. 8 is a chart illustrating UV-Vis spectra of $Ti_{0.9}Mn_{0.1}O_2$, $TiO_2$ and Degussa (P-25).

FIG. 8 is a chart illustrating UV-Vis spectra of Ti$_{0.9}$Mn$_{0.1}$O$_2$, TiO$_2$ and (P-25). The prepared sample of Ti$_{0.9}$Mn$_{0.1}$O$_2$ also shows a different optical property when compared with TiO$_2$ and Degussa P-25 (i.e. commercially available TiO$_2$ consisting of 80% anatase and 20% rutile).

Based on the above results in these examples, the catalyst layer material and fabricating method thereof in this invention as applied to the fuel cell can significantly improve the electrochemical performance and stability of the fuel cell through the multi-functional non-carbonaceous support, as compared with the commercial catalyst material of carbonaceous support.

In view of the above, the catalyst layer material, the fabricating method thereof and the fuel cell in this invention have at least following advantages:

1. The catalyst layer material and the fuel cell according to the foregoing embodiments include the non-carbonaceous catalyst support with high stability, thereby preventing corrosion problems of the existing carbonaceous support and enhancing stability and cell performance of the fuel cell.

2. The catalyst support in the catalyst layer material and the fuel cell according to the foregoing embodiments is doped with the metal elements with high conductivity, and has properties of particle size in nanometer order and porosity. Hence, an oxide carrier system can be developed with high electron conductivity and high surface area.

3. The catalyst layer material and the fuel cell according to the foregoing embodiments can offer the electrode better electrochemical performance owing to their possession of the catalyst support with enhanced conductivity and diminished resistance of mass transfer.

4. The method for fabricating the catalyst layer material according to the foregoing embodiments is implemented by the hydrothermal method to prepare the multi-functional non-carbonaceous catalyst support, of which the process is simplified and the surface area of the catalyst support is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A catalyst layer material for a fuel cell, the catalyst layer material comprising:
   a catalyst support comprising Ti$_x$M$_{1-x}$O$_2$, wherein M is selected from the group consisting of a Group IIA metal, a Group VIIB metal and a Group VIIIB metal, and 0<X≤0.9, the Group IIA metal is Sr, the Group VIIB metal is selected from the group consisting of Mn, Tc and Re, and the Group VIIIB metal is selected from the group consisting of Fe, Co and Ni; and
   a catalyst, distributed on the catalyst support.

2. The catalyst layer material according to claim 1, wherein 0.5≤X≤0.9.

3. The catalyst layer material according to claim 1, wherein the catalyst comprises Pt or Pt alloys.

4. A fuel cell, comprising:
   a first gas diffusion layer and a second gas diffusion layer;
   a first catalyst layer and a second catalyst layer both disposed between the first gas diffusion layer and the second gas diffusion layer, wherein at least one of the first catalyst layer and the second catalyst layer comprises the catalyst layer material according to claim 1; and
   a polymer film, disposed between the first catalyst layer and the second catalyst layer.

* * * * *